(12) United States Patent
Hodge et al.

(10) Patent No.: US 10,593,058 B2
(45) Date of Patent: Mar. 17, 2020

(54) HUMAN RADAR

(71) Applicants: Liam Hodge, Manchester, NH (US); Chase Alexander Fussell, Manchester, NH (US); Matthew Richard Schmitt, Merrimack, NH (US); Olivia Moreau, Litchfield, NH (US); Adrianna Grace Leonard, Litchfield, NH (US); Nathan Blais, Litchfield, NH (US); Lilliana M. Cuevas, Manchester, NH (US); James R. McSorley, Litchfield, NH (US)

(72) Inventors: Liam Hodge, Manchester, NH (US); Chase Alexander Fussell, Manchester, NH (US); Matthew Richard Schmitt, Merrimack, NH (US); Olivia Moreau, Litchfield, NH (US); Adrianna Grace Leonard, Litchfield, NH (US); Nathan Blais, Litchfield, NH (US); Lilliana M. Cuevas, Manchester, NH (US); James R. McSorley, Litchfield, NH (US)

(*) Notice: Subject to any disclaimer, the term of this patent is extended or adjusted under 35 U.S.C. 154(b) by 12 days.

(21) Appl. No.: 15/899,411

(22) Filed: Feb. 20, 2018

(65) Prior Publication Data
US 2019/0066324 A1 Feb. 28, 2019

Related U.S. Application Data

(60) Provisional application No. 62/549,190, filed on Aug. 23, 2017.

(51) Int. Cl.
| | | |
|---|---|---|
| *G06T 7/70* | (2017.01) | |
| *G09B 21/00* | (2006.01) | |
| *G01J 5/00* | (2006.01) | |
| *G06K 9/62* | (2006.01) | |
| *G06K 9/00* | (2006.01) | |

(52) U.S. Cl.
CPC .............. *G06T 7/70* (2017.01); *G01J 5/0025* (2013.01); *G09B 21/007* (2013.01); *G01J 2005/0085* (2013.01); *G06K 9/00362* (2013.01); *G06K 9/6293* (2013.01)

(58) Field of Classification Search
CPC ... G06T 7/70; G01J 5/0025; G01J 2005/0085; G09B 21/007
USPC ....................................................... 382/103
See application file for complete search history.

(56) References Cited

U.S. PATENT DOCUMENTS

2010/0019903 A1* 1/2010 Sawaya ................. G01J 5/0022
 340/552
2016/0370863 A1* 12/2016 Jones ...................... G06F 3/016

* cited by examiner

*Primary Examiner* — Amandeep Saini
(74) *Attorney, Agent, or Firm* — Preti Flaherty Beliveau & Pachios LLP

(57) ABSTRACT

Various devices and methods detect obstacles and/or people and then communicate that information to a user. One mobile device senses people and their relative angle orientation. Then it communicates the angle to the user. An apparatus uses a sensor component to detect heat sources within a field of view. In response to an object being detected, a processing component determines whether the object is a heat source; and, if the object is a heat source, a feedback component alerts the user. One method includes receiving a notification that an object is in a field of view of a device and a temperature of the object. A determination is made as to whether the object is a person based on the temperature. In response to determining that the object is a person, a user is alerted.

17 Claims, 4 Drawing Sheets

HUMAN RADAR

STATEMENT REGARDING FEDERALLY SPONSORED RESEARCH OR DEVELOPMENT

Not applicable

BACKGROUND OF THE INVENTION

Various embodiments relate generally to object recognition systems, methods, devices and computer programs and, more specifically, relate to sensing whether an object is a person.

This section is intended to provide a background or context. The description may include concepts that may be pursued, but have not necessarily been previously conceived or pursued. Unless indicated otherwise, what is described in this section is not deemed prior art to the description and claims and is not admitted to be prior art by inclusion in this section.

There are 39 million people in the world who are blind (82% are over 50 years old). The world of the blind and their faithful seeing-eye dogs has many challenges. Some of their challenges are getting around and getting people educated about what to do when you encounter them. Some people use dogs that are trained to sit down upon reaching an obstacle. When this happens, the person usually has no idea what the obstacle is. If they reach out they may be embarrassed to find that that they have touched someone's body! This can require a rushed explanation in order to explain contact. Alternatively, in tight department stores the person might even find themself apologizing to racks of clothes.

What is needed is a way to determine whether an object is a person without requiring physical contact.

BRIEF SUMMARY OF THE INVENTION

The below summary is merely representative and non-limiting.

The above problems are overcome, and other advantages may be realized, by the use of the embodiments.

In a first aspect, an embodiment provides a device that senses people and their angle orientation relative to the device. The device communicates the angle of sensed person/people to the user. The device can be mobile, able to be carried or worn by the user.

In another aspect, an embodiment provides an apparatus for detecting obstacles. The apparatus includes a sensor component configured to detect heat sources within a field of view, a feedback component configured to provide feedback to a user; and a processing component. The processing component is configured to, in response to a notification that an object is detected in the field of view, determine whether the object is a heat source; and, in response to determining that the object is a heat source, activating the feedback component to alert the user of the determination.

In a further aspect, an embodiment provides a method for sensing people. The method includes receiving a notification that an object is detected in a field of view of a device and detecting a temperature of the object. A determination is made as to whether the object is a person based on the temperature of the object. In response to determining that the object is a person, a user is alerted that a person is in the field of view of the device.

BRIEF DESCRIPTION OF THE SEVERAL VIEWS OF THE DRAWINGS

Aspects of the described embodiments are more evident in the following description, when read in conjunction with the attached Figures.

DETAILED DESCRIPTION OF THE INVENTION

One embodiment, called the HUDAR ("HUman raDAR"), uses thermal IP sensors to detect humans and pets. This information is transferred to haptic motors which quietly inform the user of a human/warm body in front of him/her. The haptic motors may also vibrate so as to provide a sense of direction towards the warm body.

Figure 1:
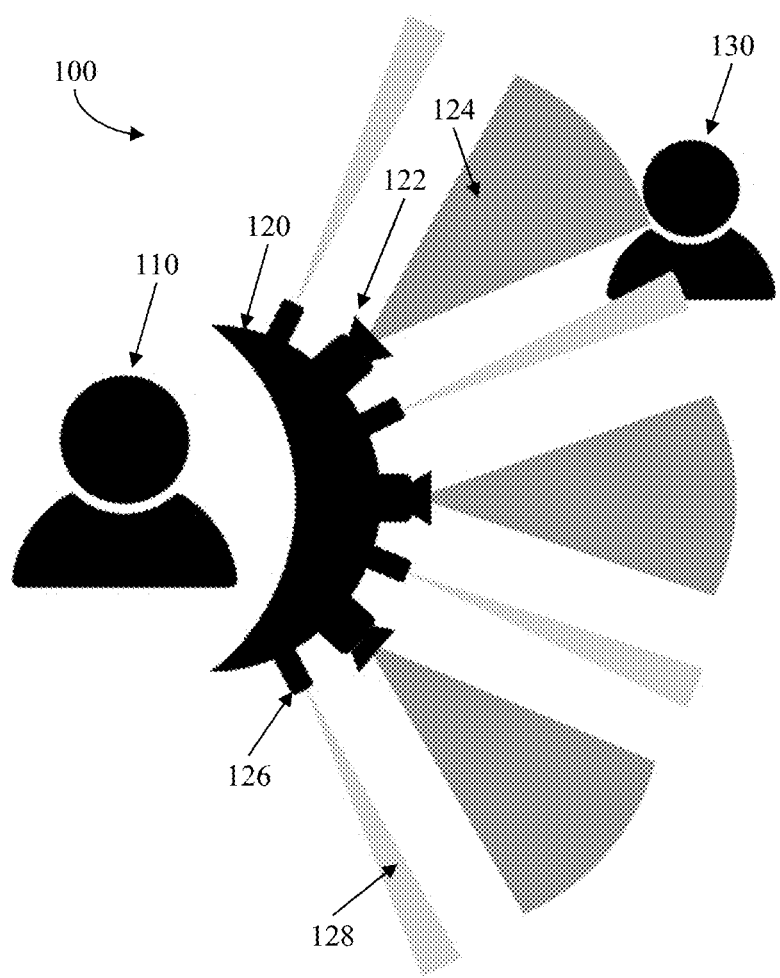
FIG. 1 illustrates an example of a user using a device in accordance with an embodiment to detect a human in the field of view of the device.

FIG. 1 illustrates an example of a device 120 in accordance with an embodiment detecting an object/person 130 in its field of view 128. In the system 100, a user 110 is using the device 120. The device 120 includes various sensors, such as sensors 122 and sensors 126. Each sensor 122,126 has an associated field of view 124, 128.

The sensors 122, 126 may be identical sensors or be different types of sensors. As one non-limiting example, sensors 122 may have a wide field of view 124 and sensors 126 may have a narrow field of view 128. Likewise, sensors 122, 126 may be configured to detect different types of information, for example, sensors 122 may be ultrasonic sensors and sensors 126 may be infrared (IR) sensors. In other, non-limiting embodiments additional types of sensors may also be included.

As shown, device 120 includes seven (7) sensors 122, 126. In other embodiments, more or less sensors 122, 126 may be used. As one non-limiting example, using three sensors, the device may be able to track a moving object/person 130.

As shown, the object/person 130 is detected within the field of view of one sensor 122. This information can be used to determine an angular orientation to the object/person 130. Data from one of the sensors 126 may be used to determine a temperature of the object/person 130. If the temperature is within the range for a person, the user may be alerted to that fact, for example, by using a feedback device (see FIGS. 2 and 4), such as a haptic motor or a headphone.

Figure 2:
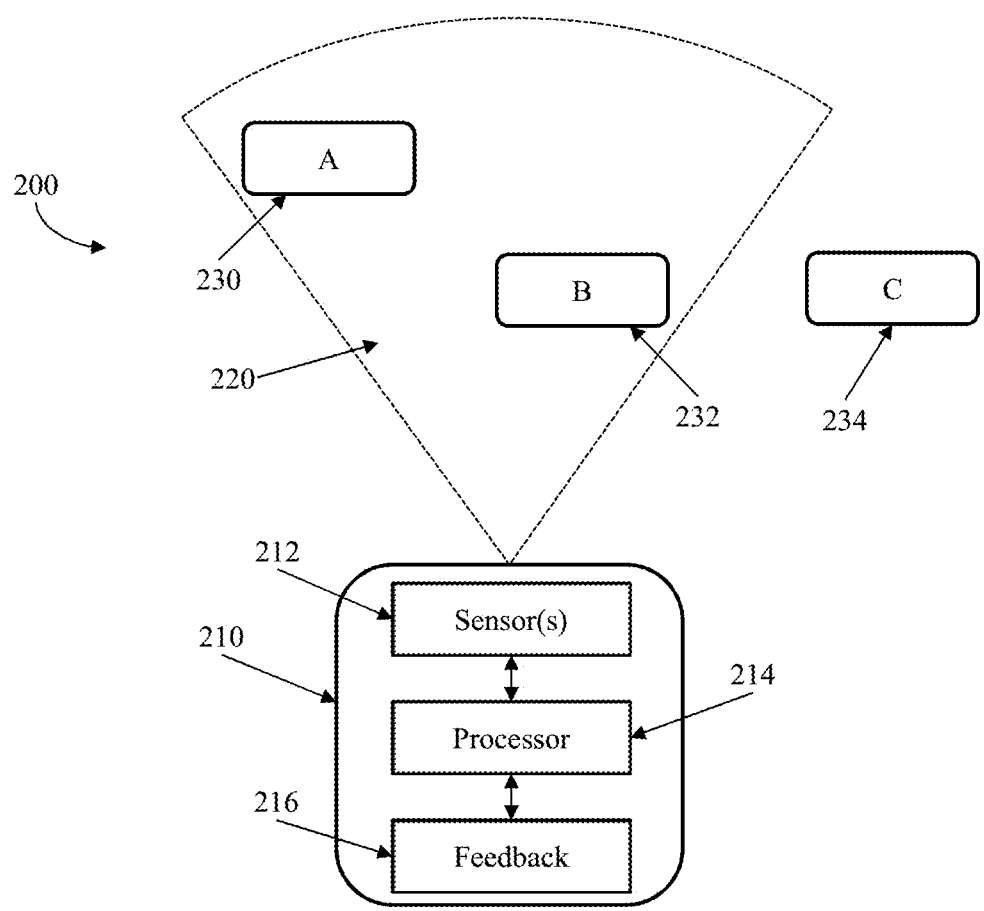
FIG. 2 is a simplified block diagram of a device and several obstacles.

FIG. 2 is a simplified block diagram of a device 210 and several obstacles 230, 232, 234. In the system 200 shown, the device 210 includes various components: sensor(s) 212, a processor 214, and a feedback component 216. These components may be separately embodied in connected devices, such as having a feedback component 216 which is wirelessly connected earphones, or the components may be integrated into a single device 210, such as handle for leash.

The sensor(s) 212 may include one or more sensors capable of determining information regarding the objects 230, 232, 234, such as temperature, distance, angular orientation, presence, etc. The sensor(s) 212 have a combined field of view 220. If multiple constituent sensors are used, the individual sensors may have overlapping fields of view.

As shown in FIG. 2, sensor(s) 212 would be able to detect object A 230 and object B 232 as being within the field of view 220. However, object C 234 would not be detected as it is not in the field of view 220. In some embodiments, sensor(s) 212 is able to detect the distance between the device 210 and various objects. Thus, the data from sensor(s) 212 could be used to determine whether object B 232 is closer than object A 230.

Information regarding any objects detected by the sensor(s) 212 is relayed to the processor 214. Processor 214 uses the information in order to determine what, if any, signals to provide the feedback component 216 in order to alert the user of the detected objects. The signals provided to the feedback component 216 may be configured to relay additional information regarding the detected objects, for example, whether the object is determined to be a person, the angular orientation toward the object, distance to the object, etc.

Processor 214 may also be configured to relay information regarding a subset of detected objects. As one example, the processor may alert the user to objects which exceed a given threshold temperature (e.g., to omit non-person objects), to objects within a given distance threshold, etc.

Figure 3:
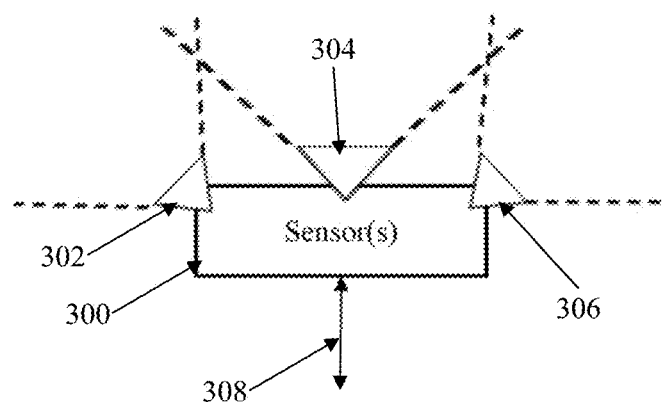
FIG. 3 is a simplified block diagram of a sensor component of a device in accordance with an embodiment.

FIG. 3 is a simplified block diagram of a sensor component 300 of a device, such as devices 120, 210, in accordance with an embodiment. As shown, there are three (3) sensors—a first sensor 302, a second sensor 304 and a third sensor 306. Each sensor 302, 304, 306 has an associated field of view which, in this example, overlap to some degree. Data from the sensor component 300 is relayed to a processor, such as processor 214, via a data line 308.

In various embodiments, the sensor component 300 may include sensors of one or more types. The sensors may also be individual sensors or elements in an array of sensors. The sensor(s) may be configured to sense the angular orientation from the device 200 towards an object at different angles, for example, by being disposed radially around at least a portion of the device and/or around the user; and/or be configured to sense various angles within an associated field of view. The sensor(s) may be one or more of: thermal sensors, passive infrared (PIR) sensors, IR cameras and/or visible light cameras.

The data from the sensor may be processed, for example, to filter out background noise; detect the heat signature of a person or people, detect the shape of a person or people, detect/identify the face(s) of a person or people, and/or detect the movement of a person or people.

The sensor(s) may also be configured to detect the distance between the device and a person/people. The sensor(s) may be one or more of: laser rangefinders, ultrasonic sensors, Radar, and/or cameras. These distance detecting sensors may be used in conjunction with other angular orientation sensors. Similar to the angular orientation sensors, the distance detecting sensors may be used in an array and may be disposed radially around at least a portion of the device and/or around the user.

The device may simultaneously detect angular orientation and distance relative to the device and/or user via various sensors or combinations sensors. This may be especially true for sensors capable of detecting both angular orientation and distance, such as, LIDAR, radar, and cameras.

Additionally, for seeing disabled applications, the device may be attached to a seeing animal. Gestures or other indicators from the animal may be received by the device and used in the detection of obstacles, for example, in one, non-limiting embodiment, the change in stance of seeing-eye dog from standing/walking to sitting may be interpreted as an indication that an object is present. The device may then detect the surroundings in order to determine whether the object is a person (e.g., based on temperate, facial recognition, etc.) and then notify the user accordingly. In this way the information relayed to the disabled person about the environmental surroundings is also augmented.

Figure 4A:
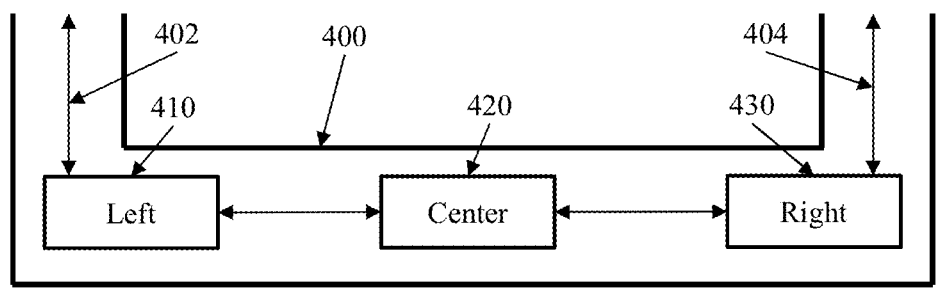
FIGS. 4A and 4B, collectively referred to as FIG. 4, show simplified block diagrams of feedback components of devices in accordance with various embodiments.

FIG. 4A shows a simplified block diagram of a feedback component 400 of a device in accordance with an embodiment. As shown, there are two (2) data lines 402, 404 which may be used to relay information between haptic engines 410, 420, 430 and a controller, such as processor 214. In other non-limiting embodiments, one of the data lines 402, 404 may be omitted. In another non-limiting embodiment, the haptic engines 410, 420, 430 may receive signals via wireless communications.

The feedback component 400 is shown as a handle having a left haptic engine 410, a center haptic engine 420 and a right haptic engine 430. By controlling the haptic engines 410, 420, 430 the user may be provided an indication of angular orientation towards and obstacle and/or a distance to the obstacle, for example, center haptic engine 420 may be activated alone in order to indicate an object directly in front of the device; or both left haptic engine 410 and center haptic engine 420 may be activated simultaneously to indicate an object is to the left of center; etc. Likewise, the strength of the activation may also be used to relay distance to the object, such as, by having the haptic engines 410, 420, 430 more strongly when the object is closer.

Additional embodiments may use the haptic engines 410, 420, 430 to relay other information. As one, non-limiting embodiment, the haptic engines 410, 420, 430 may pulsate in a given pattern in order to provide specific information to the user, for example, using a 'heart-beat' type signal to indicate an obstacle.

The haptic engines 410, 420, 430 may operate on continuous cycle or they may operate on a regular interval, for example, every two seconds or every five seconds.

In further embodiments, the feedback component 400 may use non-haptic feedback elements either in addition to or instead of the haptic engines 410, 420, 430. For example, the feedback component 400 may include audio speakers (e.g., in a headphone) and/or light emitting elements (e.g., in a pair of glasses).

In another embodiment, the feedback elements of feedback component 400, such as, haptic engines 410, 420, 430, may be embodied in one or more individual objects, for example, a handle, a pair of gloves, etc.

In further embodiments, the feedback component 400 may include more or less feedback elements, for example, a single haptic engine may be used to indicate information regarding an object in a given orientation (such as directly ahead); or multiple light emitting elements may be used to provide a fine-grained (or high resolution) indication of direction.

The feedback elements may also be configured to communicate angular orientation and/or distance. The feedback elements may be located in one or more of: a device handle, a seeing animal harness, a cane, a glove, a vest, a belt, glasses, a hat, necklace, purse, shoes, and/or a handheld mobile device, such as a phone. In some embodiments, the feedback elements may be incorporated into a handheld or wearable device which is decorated or serves another function, such as a magic wand, an amulet, a watch, etc. Multiple types of feedback elements may be incorporated into the device and/or used in connection with the device, for example, using both audio speakers connected via a wireless communication and haptic engines within the device itself.

The feedback elements may be disposed at various locations of the device and/or on the user. A handle held horizontally, such as shown in FIG. 4A, may be used to provide left, right and center information as described above. Similarly, a feedback elements in a pair of gloves or a handle held vertically (such as on a cane) may have haptic engines which provide left and right information.

Figure 4B:
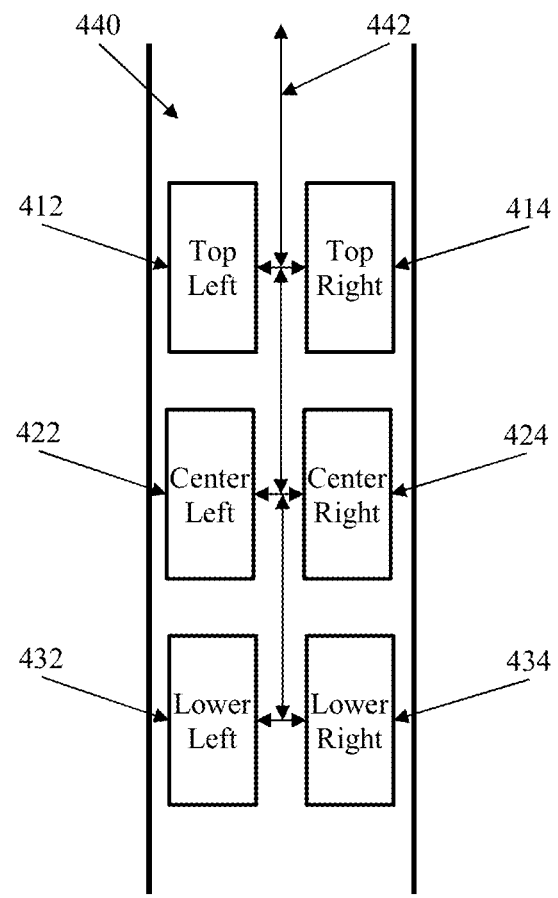

FIG. 4B shows a simplified block diagram of another feedback component 440 of a vertically held device in accordance with an embodiment. As shown, there is one data line 442 which may be used to relay information between left and right haptic engines 412, 414, 422, 424, 432, 434 and a controller, such as processor 214.

In various embodiments, the device may include a sensor configured to determine how the handle is being held and the signals to the feedback elements may be configured accordingly. As one, non-limiting embodiment, when held vertically, haptic engines 412, 414, 422, 424, 432, 434 may be used individually or in conjunction to provide left and right information (such as using right haptic engines 412, 422 and 432 together); but when held horizontally pairs of haptic engines may be used simultaneously, such as center haptic engines 422 and 424 operating together to function similarly to center haptic engine 420 in FIG. 4A.

When using audio feedback elements, such as earphones, headphones, ear buds, or a worn array of speakers, the device may communicate the angle of sensed person/people via audible signals. A spoken signal relayed to the user may include information such as "left", "front", "right", "back" and/or a combination of these and/or in higher resolutions. To indicate distance to the user the spoken signal is scaled in amplitude with distance, or a verbal indication of distance is given. Alternatively, Non-spoken signal may be relayed to the user, such as pings or pulses indicating angular orientation of the sensed person/people. To the user, the non-spoken signals appear to emanate from the direction of the sensed person/people.

Figure 5:
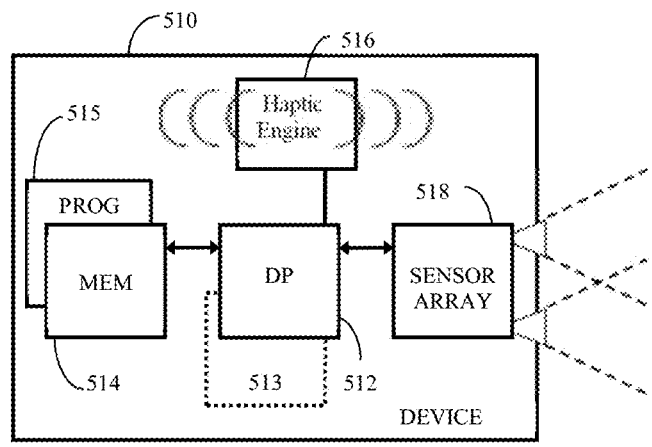
FIG. 5 shows a simplified block diagram of a device that is suitable for practicing various embodiments.

FIG. 5 shows a block diagram of a device that is suitable for use in practicing various embodiments. In FIG. 5, the device 510 includes a controller, such as a data processor (DP) 512, a computer-readable medium embodied as a memory (MEM) 514 that stores computer instructions, such as a program (PROG) 515, and a suitable detection component, such as a sensor array 516. Device 510 also includes a haptic engine component 518 and/or a dedicated processor, for example a feedback processor 513 configured to provide feedback in a manner sufficient to relay directional information, such as by individually activating sub-components of the haptic engine component.

The program 515 may include program instructions that, when executed by the DP 512, enable the device 510 to operate in accordance with an embodiment. That is, various embodiments may be carried out at least in part by computer software executable by the DP 512 of the device 510, by hardware, or by a combination of software and hardware.

In general, the device 510 may be embodied as a single device. Alternatively, various components may be embodied in separate devices, for example, the sensor array 518 may be embodied in a helper animal harness and/or the haptic engine component 518 may be embodied in a wearable device such as a pair of glasses.

The MEM 514 may be of any type suitable to the local technical environment and may be implemented using any suitable data storage technology, such as magnetic memory devices, semiconductor based memory devices, flash memory, optical memory devices, fixed memory and removable memory. The DP 512 may be of any type suitable to the local technical environment, and may include general purpose computers, special purpose computers, microprocessors and multicore processors, as non-limiting examples. The communication interface (e.g., RF antenna 516) may be of any type suitable to the local technical environment and may be implemented using any suitable communication technology such as RF systems, including the use of near field communication systems, optical communication systems, such as infrared systems and/or optical scanning systems, induction communication systems, or a combination of such components. Additionally, the communication interface may be a bidirectional interface using transmitters, receivers, and/or transceivers, or, as appropriate for the embodiment, a unidirectional interface.

As described above, various embodiments provide a method, apparatus and computer program(s) to sense whether an object is a person.

Figure 6:
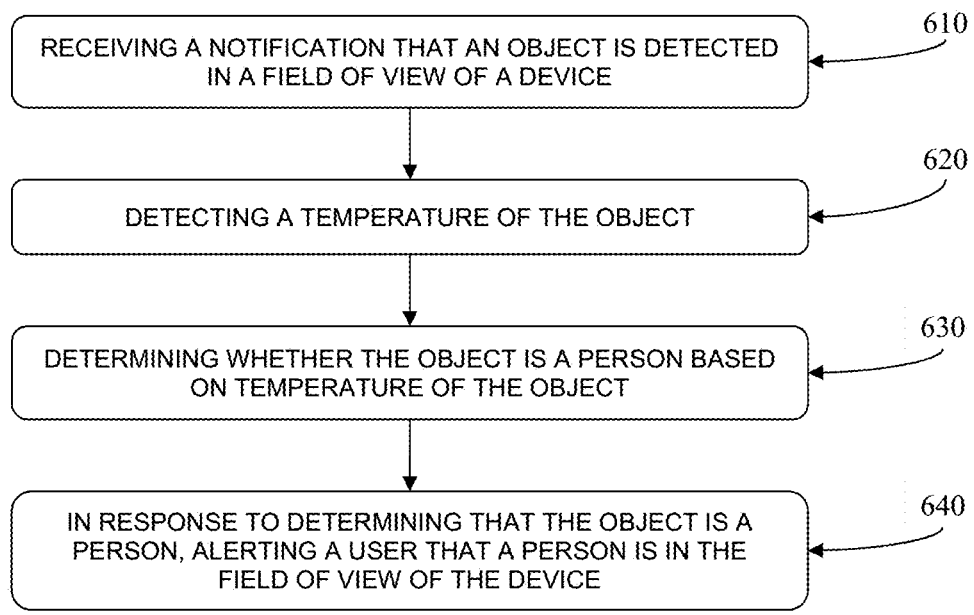
FIG. 6 is a logic flow diagram that illustrates the operation of a method, and a result of execution of computer program instructions embodied on a computer readable memory, in accordance with various embodiments.

FIG. 6 is a logic flow diagram that illustrates a method, and a result of execution of computer program instructions, in accordance with various embodiments. In accordance with an embodiment a method performs, at Block 610, a step of receiving a notification that an object is detected in a field of view of a device. A step of detecting a temperature of the object is performed at Block 620. The method also performs a step of determining whether the object is a person based on temperature of the object, at Block 630, and, in response to determining that the object is a person, a step of alerting a user that a person is in the field of view of the device at Block 640.

The various blocks shown in FIG. 6 may be viewed as method steps, as operations that result from use of computer program code, and/or as one or more logic circuit elements constructed to carry out the associated function(s).

Various operations described are purely exemplary and imply no particular order. Further, the operations can be used in any sequence when appropriate and can be partially used. With the above embodiments in mind, it should be understood that additional embodiments can employ various computer-implemented operations involving data transferred or stored in computer systems. These operations are those requiring physical manipulation of physical quantities. Usually, though not necessarily, these quantities take the form of electrical, magnetic, or optical signals capable of being stored, transferred, combined, compared, and otherwise manipulated.

Any of the operations described that form part of the presently disclosed embodiments may be useful machine operations. Various embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines employing one or more processors coupled to one or more computer readable medium, described below, can be used with computer programs written in accordance with the teachings herein, or it may be more convenient to construct a more specialized apparatus to perform the required operations.

The procedures, processes, and/or modules described herein may be implemented in hardware, software, embodied as a computer-readable medium having program instructions, firmware, or a combination thereof. For example, the functions described herein may be performed by a processor executing program instructions out of a memory or other storage device.

The foregoing description has been directed to particular embodiments. However, other variations and modifications may be made to the described embodiments, with the attainment of some or all of their advantages.

In a further related embodiment the device may provide obstacle detection. The device may sense location of the user and provide directional navigation. Using one or more of the sensors above, the device can determine an intended path for the user to travel (e.g., using a mapping program). The path can be communicated to the user, such as by using audio, tactile, and/or visual signals. As one, non-limiting embodiment, haptic feedback engines may provide a regular, but gentle, pulsation while the user is headed in the correct direction. If the user is pointed in the wrong direction, the haptic feedback engines may provide a warning signal. The warning signal may also provide a directional indication to guide the user back to the path.

Optionally, the device may sense obstacles and/or trip hazards for the user. Using one or more of the sensors above, the device can detect obstacles along the user's intended path. The angular orientation and distance of the obstacles can be communicated to the user, such as by using audio, tactile, and/or visual signals. Alternatively, the device may guide the user around such obstacles. In some embodiments, the device may indicate whether or not the obstacle is a person.

In another related embodiment the device may provide person identification. The device may sense and communicate the identity of friends/known persons nearby, e.g., via a combination of the sensors above and facial recognition software, via communication with a device on the person (such as a cellphone). The device may communicate the presence, angular orientation, and distance information of a friend/known person to the user by a combination of the above spoken and non-spoken audio signals above. Additionally, the device may say the friend/known person's name, and/or provide customized feedback associated with the person (such as a pre-set pulsation pattern). The facial recognition may be performed in addition to other functions of the device, such as, obstacles detection, directional navigation, etc.

Modifications to the above-described systems and methods may be made without departing from the concepts disclosed herein. Accordingly, the invention should not be viewed as limited by the disclosed embodiments. Furthermore, various features of the described embodiments may be used without the corresponding use of other features. Thus, this description should be read as merely illustrative of various principles, and not in limitation of the invention.

What is claimed is:

1. An apparatus for detecting living objects, the apparatus comprising:
    a position sensor configured to detect when a helper animal has sat down;
    a sensor component configured to detect heat sources within a field of view;
    a feedback component configured to provide feedback to a user; and
    a processing component configured to:
        in response to a notification that the helper animal has sat down, determine whether an object in the field of view is a living object; and
        in response to determining that the object is a living object, activating the feedback component to alert the user of the determination.

2. The apparatus of claim 1, wherein the sensor component comprises at least one of: a thermal sensor, a passive infrared sensor, and an infrared camera.

3. The apparatus of claim 1, wherein the processing component is further configured to activate the sensor component in response to a detection that the helper animal has sat down.

4. The apparatus of claim 1, further comprising a sensor configured to detect objects within the field of view, and
    wherein the processing component is further configured to receive an indication of an object within the field of view.

5. The apparatus of claim 1, wherein the feedback component comprises at least one of: a haptic engine, a speaker, and a light.

6. The apparatus of claim 1, wherein the feedback component comprises a plurality of haptic engines, and
    activating the feedback component comprises activating a subset of the plurality of haptic engines in order to provide a directional indication towards the object.

7. The apparatus of claim 6, where the plurality of haptic engines are linearly arranged within a handle.

8. The apparatus of claim 6, where the plurality of haptic engines are linearly arranged within a wearable frame for eyeglasses.

9. The apparatus of claim 1, wherein the feedback component comprises a plurality of speakers, and
    activating the feedback component comprises activating at least one of the plurality of speakers in order to provide a directional indication towards the object.

10. The apparatus of claim 1, wherein activating the feedback component comprises activating the feedback component at an intensity based at least in part on a distance between the object and the apparatus.

11. A method for sensing living objects, the method comprising:
    receiving, at a device, a notification that a helper animal has sat down;
    detecting a temperature of an object in a field of view of the device;
    determining whether the object is a living object based on the temperature of the object; and
    in response to determining that the object is a living object, alerting a user that a living object is in the field of view of the device.

12. The method of claim 11, further comprising determining an angle of orientation towards the object, and
    wherein alerting the user of the determination includes providing an indication of the angle of orientation towards the object.

13. The method of claim 11, wherein alerting the user comprises activating at least one haptic engine in order to provide a directional indication towards the object.

14. The method of claim 11, wherein alerting the user comprises activating at least one speaker in order to provide a directional indication towards the object.

15. The method of claim 11, further comprising determining a distance from the device to the object, and
    wherein alerting the user of the determination includes providing an indication of the distance.

16. The method of claim 11, wherein alerting the user comprises activating at least one haptic engine at an intensity based on a distance from the device to the object.

17. The method of claim 11, wherein alerting the user comprises activating at least one speaker at an intensity based on a distance from the device to the object.

\* \* \* \* \*